BALANCED PHASE DETECTOR

Filed April 16, 1949 5 Sheets-Sheet 1

Inventor:
Wolf J. Gruen,
by Merton D. Moore
His Attorney.

Inventor:
Wolf J. Gruen,
by Merton D. Moore
His Attorney.

Inventor:
Wolf J. Gruen,
by Merlon D. Morse
His Attorney.

May 27, 1952 W. J. GRUEN 2,598,370

BALANCED PHASE DETECTOR

Filed April 16, 1949 5 Sheets-Sheet 4

Inventor:
Wolf J. Gruen,
by Merton D. Moore
His Attorney.

May 27, 1952 W. J. GRUEN 2,598,370

BALANCED PHASE DETECTOR

Filed April 16, 1949 5 Sheets-Sheet 5

Inventor:
Wolf J. Gruen,
by Merton D. Moore
His Attorney.

Patented May 27, 1952

2,598,370

UNITED STATES PATENT OFFICE 2,598,370

BALANCED PHASE DETECTOR

Wolf J. Gruen, Syracuse, N. Y., assignor to General Electric Company, a corporation of New York Application April 16, 1949, Serial No. 87,862

14 Claims. (Cl. 250—36)

Figure 1:
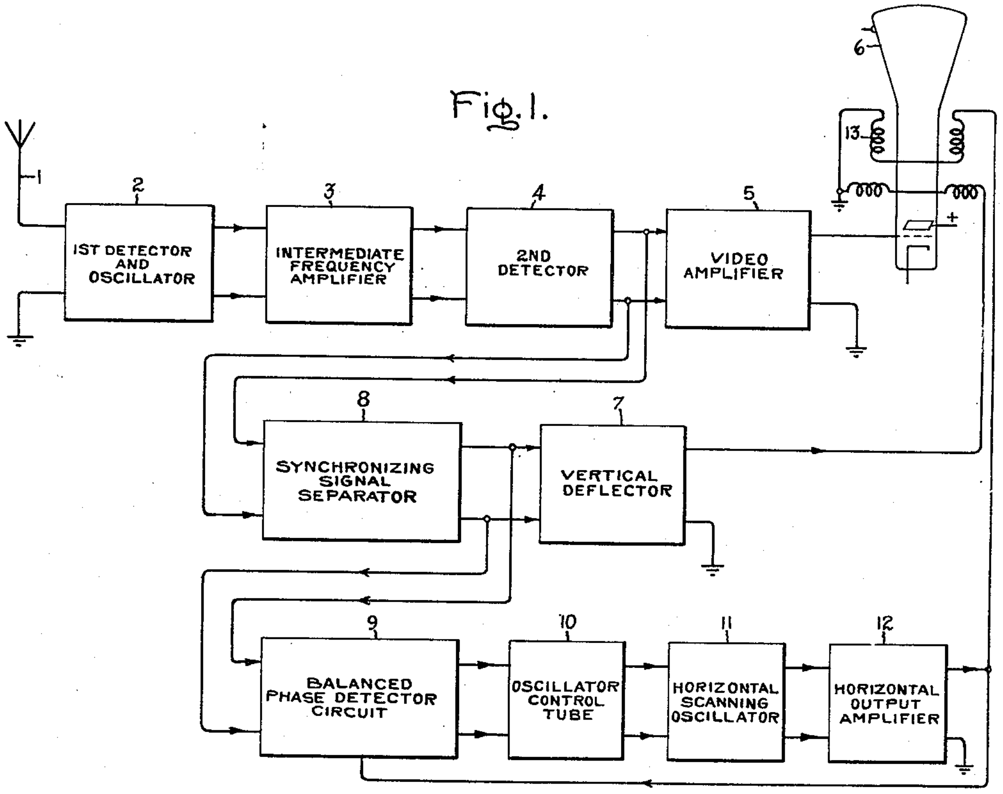

My invention relates to balanced detectors, and more particularly to balanced detectors which are adapted to provide a substantially continuous control voltage which varies in accordance with the phase relationship of two independent voltage sources. While my invention is of general utility, it is particularly useful in television receivers as an automatic frequency control circuit for the scanning oscillators, particularly the line frequency scanning oscillator, of the television receiver.

In many instances it is necessary to synchronize an oscillator with an externally produced synchronizing signal. Such a requirement is found, for example, in television receivers of the modulated carrier wave type in which it is necessary to synchronize the scanning oscillators of the receiver with the scanning generators at the transmitter by means of a synchronizing signal which appears as modulation on the received television signal. Certain arrangements heretofore proposed have provided automatic frequency control circuits for the scanning oscillators of the receiver in which the received synchronizing signal is combined with an output wave from the scanning oscillator of the television receiver to produce a unidirectional control voltage, the magnitude of the control voltage varying in accordance with the phase relationship of the synchronizing signal and the output wave from the scanning oscillator.

In order to provide some measure of discrimination againts noise impulses which may be interspersed with the desired synchronizing signal, these systems have provided opposed rectifier circuits across which are produced equal and opposite voltages in response to the synchronizing and oscillator signals. With such an arrangement, the system is balanced with respect to the input voltage and noise impulses and other extraneous and undesired signals do not seriously affect the derivation of a control voltage from the balanced circuit.

However, in previous balanced rectifier circuits it has been necessary to utilize a phase inverter stage or a transformer with a center tapped secondary to provide the necessary balanced input voltages for the rectifier circuits. It would be extremely desirable to utilize balanced rectifier circuits without providing an intermediate phase inverter stage or similar expedient. Accordingly, it is a primary object of my invention to provide a new and improved balanced phase detector circuit which is particularly adapted for use in the horizontal deflection circuit of a television receiver.

It is another object of my invention to provide a new and improved balanced phase detector circuit which is particularly insensitive to noise impulses which may be present in synchronizing signals applied thereto.

It is a further object of my invention to provide a new and improved phase detector circuit in which balanced voltages are obtained without the use of a phase inverter stage or the like.

It is a still further object of my invention to provide a new and improved balanced phase detector circuit adapted to compare voltages from two separate voltage sources in which the voltage sources and the phase detector circuit all have a common point of fixed potential.

Briefly, in accordance with one phase of my invention, synchronizing signals which have been separated from the composite television signal are compared with output pulses from the horizontal scanning oscillator in the phase detector circuit. The phase detector circuit comprises a pair of peak detector circuits which are connnected in series opposition across a load circuit. Synchronizing pulses are connected across the first peak detector, the load circuit, which is primarily capacitive, effectively connecting the second peak detector in parallel with the first peak detector. As the peak detectors are connected in series opposition across the load circuit, synchronizing pulses of equal amplitude, but of opposite polarity, appear in series relationship across the load circuit. The oscillator output pulses are connected across the load circuit, and therefore across the peak detectors in series, the load circuit integrating the oscillator pulses to produce equal saw tooth voltages of the same polarity across each peak detector. Superposition of synchronizing pulses of opposite polarity upon saw tooth voltages of the same polarity results in a total voltage produced across each peak detector circuit which varies in accordance with the phase relationship of the synchronizing pulses and the oscillator pulses. The composite voltage across the load circuit, which will have an average value of zero if the oscillator is in phase with the synchronizing pulses, due to the balanced operation of the peak detector circuits, is integrated to produce a substantially continuous control voltage which is utilized to control the frequency of the scanning oscillator. In a specific embodiment there is provided means for equalizing the saw tooth voltages produced across the two peak detector circuits so that completely balanced operation is obtained. Also, in a preferred embodiment, the synchronizing pulses may be integrated slightly to correct for the phase difference which may exist between the two pulse sources when the phase detector is in a balanced state.

Figure 2:
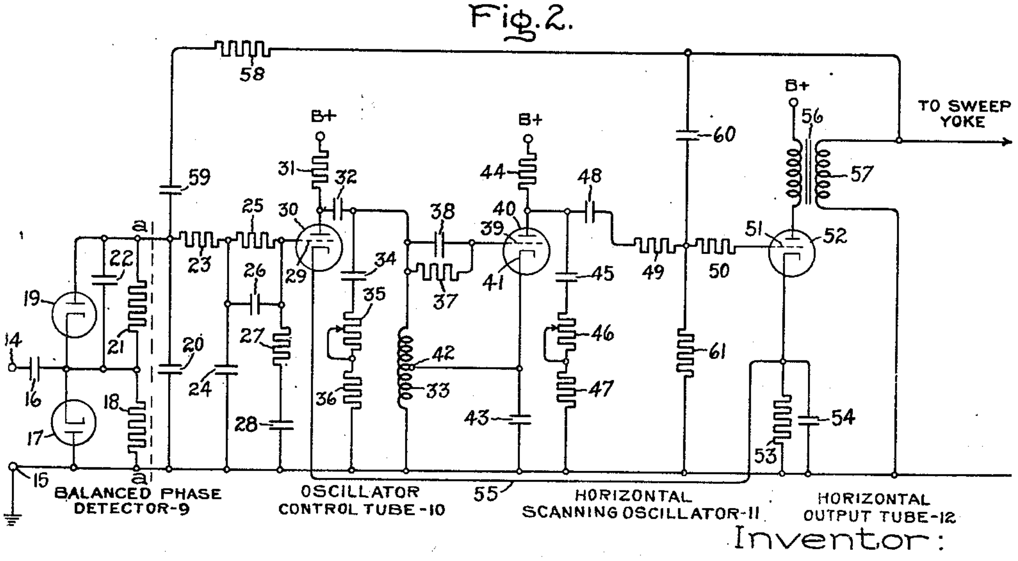
Figure 3:
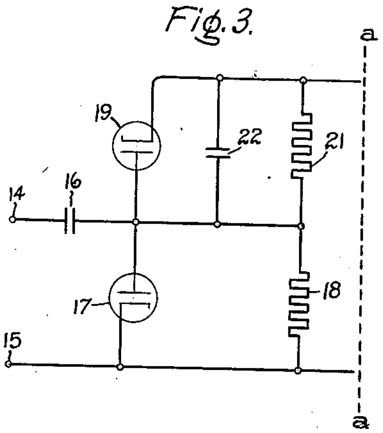
Figure 4:
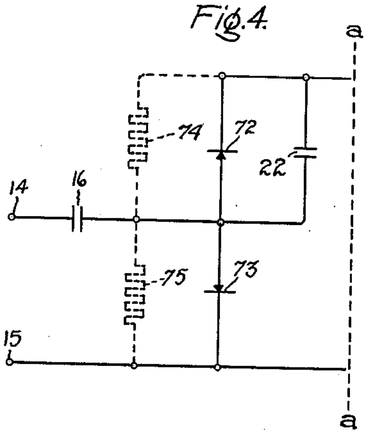
Figure 5:
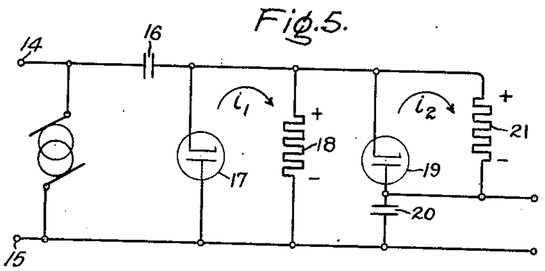
Figure 6:
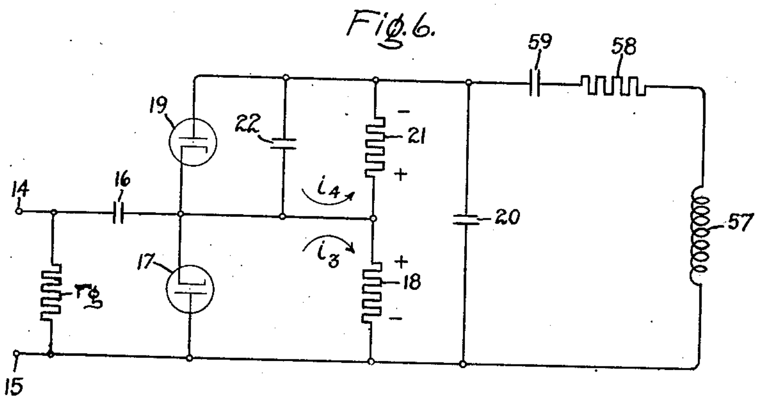

The novel features which are considered to be characteristic of my invention are set forth with particularity in the appended claims. My invention itself, however, both as to its organization and method of operation, together with further objects and advantages thereof, may best be understood by reference to the following description taken in connection with the accompanying drawing wherein Fig. 1 is a block diagram of a television receiver embodying one form of my invention in the horizontal deflection circuit thereof; Fig. 2 is a schematic diagram of a portion of the circuit of Fig. 1; Fig. 3 is an alternative embodiment of a portion of the circuit of Fig. 2; Fig. 4 is another alternative embodiment of a portion of the circuit of Fig. 2; Figs. 5 and 6 are circuit diagrams of portions of the circuit of Fig. 2 which are used in explanation of the operation thereof; and Figs. 7 (*a*)–7 (*g*) are timing diagrams of the wave forms which are produced in the circuit of Fig. 2.

Referring now to the drawing, the system illustrated in Fig. 1 comprises a modulated carrier wave television receiver of the superheterodyne type including an antenna system 1 connected to a first detector and oscillator 2, to which are connected in cascade relation in the order named an intermediate frequency amplifier 3, a second detector 4, a video amplifier 5 and a cathode ray tube viewing device 6. A vertical deflection circuit 7 is connected to the output of the second detector 4 through a synchronizing signal separator 8. The output of synchronizing signal separator 8 is also applied to a horizontal deflection circuit comprising a balanced phase detector circuit 9, to be described fully hereinafter, an oscillator control tube 10, a horizontal scanning oscillator 11, and a horizontal output amplifier 12. The output of amplifier 12 is connected to the horizontal scanning coil 13 and is also connected in feedback relation to the balanced phase detector circuit as will be described more completely hereinafter.

The units 1 through 8 inclusive may all be of conventional well known construction as may be the units 10, 11 and 12, with the exception of the above mentioned feedback connection from amplifier 12, so that a detailed illustration thereof is unnecessary herein. Referring briefly, however, to the operation of the above described system as a whole, television signals intercepted by antenna circuit 1 are applied to oscillator-detector 2, wherein they are converted into intermediate frequency signals which in turn are selectively amplified in the intermediate frequency amplifier 3 and delivered to the second detector 4. The modulation components of the received signal are detected in second detector 4 and are applied to the video frequency amplifier 5, wherein they are amplified and from which they are supplied in the usual manner to control the electrode of the cathode ray tube viewing device 6. The detected modulation components are also supplied to the synchronizing signal separator 8 wherein the vertical and horizontal synchronizing signals are separated from the video signal, the vertical synchronizing signal being applied to the vertical deflection circuit 7. Scanning waves which are generated in the horizontal scanning oscillator 11 are amplified in the horizontal amplifier 12 and applied to the scanning coil 13 of the cathode ray tube device. Likewise, scanning waves from the vertical deflection circuit 7 are applied to the scanning coils associated therewith, so as to produce magnetic scanning fields which deflect the scanning wave in two directions normal to each other so as to trace a rectilinear pattern on the screen and thereby to reconstruct the transmitted image.

Referring now more particularly to the portion of Fig. 1 embodying the present invention, there is shown in Fig. 2 the circuit diagram of the balanced phase detector circuit 9, the oscillator control tube 10, the horizontal scanning oscillator 11, and the horizontal output amplifier 12, which are shown in block diagram form in Fig. 1. Synchronizing pulses of negative polarity from the synchronizing signal separator 8 are applied to input terminals 14, 15, the synchronizing pulses being coupled through a capacitor 16 to the cathode of a diode rectifier 17, the anode of diode rectifier 17 being connected to ground terminal 15. A diode load resistor 18 is connected across diode rectifier 17. The cathode of a second diode rectifier 19 is connected to the cathode of diode 17 and to capacitor 16. The anode of diode rectifier 19 is connected to a capacitor 20. A second diode load resistor 21 and a capacitor 22 are connected across diode 19. A series combination of a resistor 23 and a capacitor 24 is connected across the capacitor 20. A network comprising a parallel combination of resistor 25 and capacitor 26, and a series combination of resistor 27 and capacitor 28, is connected across capacitor 24 to prevent hunting tendencies of the synchronizing system, as will be described more fully hereinafter.

The junction point of the series and parallel combinations mentioned above is connected to the control electrode 29 of an electron discharge device 30. The anode of electron discharge device 30 is connected through a resistor 31 to a unidirectional source of potential indicated by the legend B+. The anode of device 30 is also connected through a capacitor 32 and an inductance 33 to ground. A capacitor 34, a variable resistor 35, and a resistor 36 are connected in series across inductance 33. The upper end of inductance 33 is connected through a parallel combination of resistor 37 and capacitor 38 to the control electrode 39 of an electron discharge device 40. The cathode 41 of device 40 is connected to a tap 42 on inductance 33 and is also connected through a capacitor 43 to ground. The anode of device 40 is connected through a resistor 44 to the B+ source of unidirectional potential. The anode of device 40 is also connected through a capacitor 45, a variable resistor 46 and a fixed resistor 47 to ground. A capacitor 48 is connected from the anode of device 40 through resistors 49, 50 to the control electrode 51 of an electron discharge device 52. The cathode of device 52 is connected through a parallel combination of a resistor 53 and a capacitor 54 to ground. The cathode of device 52 is also connected through a lead 55 to the cathode of device 30. The anode of device 52 is connected through the primary of a sweep output transformer 56 to the B+ source of unidirectional potential. One side of the secondary 57 of sweep transformer 56 is connected to ground, the other side being connected to the sweep yoke surrounding the neck of the cathode ray tube. A feedback connection is provided from the ungrounded side of secondary 57 through a resistor 58 and capacitor 59 to the load circuit capacitor 20 of the phase detector circuit 9. A feedback capacitor 60 is also connected from the ungrounded side of secondary 57 to the junction of resistors 49 and 50, a grid leak resistor 61 completing the control electrode path of device 52.

Considering now the general operation of the horizontal deflection circuit shown in Fig. 2, without considering in detail the operation of the balanced phase detector circuit 9, it will be seen that electron discharge device 40 is operated as a cathode tuned Hartley oscillator, the tank circuit for this oscillator comprising inductance 33 and capacitor 43, and the networks including capacitors 32 and 34. The resonant frequency of the tank circuit may be varied by means of variable resistor 35, the variation in this resistance operating to change the effective capacitance of the tank circuit in a manner which will be readily apparent to those skilled in the art. Such a method is commonly called "resistance tuning" of the oscillator.

Due to the narrow conduction angle of the oscillator, the anode current thereof is in the form of relatively narrow pulses. The pulses of oscillator anode current operate periodically to discharge capacitor 45 which has previously been charged from the B+ potential through resistors 44, 46 and 47. There is thus produced in the anode circuit of device 40 a scanning voltage which is suitable for scanning the cathode ray tube, the amplitude of which may be varied by variable resistor 46. The scanning voltage is coupled to the control electrode of device 52 wherein it is amplified and coupled to the sweep yoke through sweep transformer 56. During retrace intervals there is produced across secondary 57 negative pulses which arise due to the transient which occurs during the current reversal therein. The negative pulses appearing across secondary 57 are coupled through the resistor capacitor combination 58, 59 to load capacitor 20 of the phase detector circuit. The phase detector circuit compares the phase relationship of the synchronizing pulses applied to terminals 14, 15 and the feedback pulses appearing across secondary 57 and produces a composite control voltage across capacitor 20 in a manner which will be described more fully hereinafter.

The composite voltage appearing across capacitor 20 is filtered in a plural section filter network, the first section of which comprises resistor 23 and capacitor 24. The second section of the filter network, comprising resistor 25 and capacitor 28, produces further integration of the composite voltage across capacitor 20. The time constant of the filter network is made short enough to follow relatively rapid changes in the phase relationship between the two voltages being compared and yet long enough to integrate the composite voltage over a large number of cycles so that the deleterious effects of noise and other extraneous impulses are averaged out and a substantially continuous control voltage may be obtained.

To stabilize the synchronizing system and to prevent hunting tendencies thereof, a differentiating network comprising capacitor 26 and resistor 27 is provided. The differentiating network 26, 27 provides a leading component of control voltage which anticipates the over-shoot of the main control voltage and operates to maintain the system in a stabilized position at the desired phase relationship.

The phase detector circuit 9 provides a substantially continuous control voltage which is supplied to the control electrode of control tube 30. Control tube 30 acts as a variable resistance which is in series with capacitor 32 across the oscillator tank circuit inductance 33. Variation in the control voltage applied to control tube 30 varies the resistance of the anode cathode space path thereof, and changes the resonant frequency of the tank circuit in the same way as variable resistor 35 is used manually to vary the frequency of the oscillator. A connection of the cathode of device 30 to the cathode of device 52 is provided so that bias voltage for control tube 30 may be conveniently obtained, inasmuch as the control voltage applied to the control electrode of control tube 30 is normally at ground potential, as will be described more fully hereinafter.

Referring now in more detail to the operation of the balanced phase detector, let us first consider the operation of the detector when synchronizing pulses are applied thereto. To facilitate description of the balanced phase detector upon application of synchronizing pulses, reference is now made to Fig. 5 wherein the component parts of the phase detector of Fig. 2 have been rearranged to illustrate more readily the operation thereof. In Fig. 5, the load circuit capacitor 20 and the parallel combination of diode rectifier 19 and resistor 21 are indicated as being connected in parallel with the first peak detector circuit. However, it will be understood that the circuit connections shown in Fig. 5 are identical to those of Fig. 2, the rearrangement of elements being made merely for purposes of clarity in describing the operation of the circuit.

It will be apparent to those skilled in the art that the capacitor 16 couples the synchronizing pulses of negative polarity to a first peak detector circuit comprising resistor 18 and diode rectifier 17. As the result of such coupling a rectified current $i_1$ will flow in resistor 18 in the direction indicated by the arrow, and there is produced across resistor 18 a voltage of the polarity indicated. The capacitor 16 will also couple synchronizing pulses to the second peak detector circuit comprising diode rectifier 19, and resistor 21, and provided capacitor 20, which is in series with the second peak detector circuit is sufficiently large, capacitor 20 will have substantially no effect upon the application of synchronizing pulses to the second peak detector circuit. The synchronizing pulses which are applied to the second peak detector 19, 21 will cause a flow of rectified current of $i_2$ through resistor 21 in the direction indicated by the arrow and there will be produced across resistor 21 a voltage of the polarity indicated. It will, therefore, be seen that the synchronizing pulses are connected across the first peak detector circuit and that the load circuit, comprising primarily capacitor 20, effectively connects the second peak detector circuit in parallel with the first peak detector circuit.

If we consider the peak detectors as being connected in parallel across the source of synchronizing pulses, by virtue of the low impedance path through capacitor 20, the voltages produced across each peak detector appear to be of the same polarity. However, it must be remembered that capacitor 20, while it does have a low impedance, does not constitute a direct connection of the second peak detector to ground but instead may have a voltage produced thereacross. Therefore, if we consider the voltage across capacitor 20, we see that the voltages of the peak detector circuits are in series opposition, although the peak detector voltages have been produced by a substantially parallel connection to the source of synchronizing pulses. It is this feature of my invention which permits the application of the synchronizing pulses directly to the phase detector circuit without the use of an intermediate phase inverter stage, as the peak detector circuits are so connected as to produce equal and opposite voltages which appear in balanced relationship across the load circuit capacitor 20. It should be noted that this unique result is obtained although the source of synchronizing pulses and the load circuit are connected to a common point of fixed potential, namely the ground terminal 15.

To investigate the behaviour of the phase detector circuit upon application of the negative feedback pulses which appear across the secondary 57 of the sweep output transformer 56, reference is now made to Fig. 6 wherein the portions of the phase detector circuit relevant to this operation have been set forth. In Fig. 6 the source of synchronizing signals has been replaced by an equivalent resistance $r_g$ and the load circuit has been indicated by the single capacitor 20 as was done in connection with Fig. 5. Negative pulses which appear across secondary 57 are coupled through the network 58, 59 to load capacitor 20. Capacitor 59, in conjunction with resistors 18, 21 operates to remove from ground the pulse voltage which is produced across secondary 57. The network comprising load capacitor 20 and resistor 58 integrates the pulse voltage which appears across secondary 57 so that there is produced across capacitor 20 a saw tooth voltage. Due to the isolation effect of capacitor 59, the saw tooth voltage produced across capacitor 20 has its alternating current axis at ground potential, which means that the average voltage across capacitor 20 due to the saw tooth voltage will be zero.

The peak detectors form a voltage divider across capacitor 20, and if the impedances of the peak detector circuits are substantially equal, equal saw-tooth voltages of the same polarity and of one-half the amplitude of the total saw-tooth voltage across capacitor 20 will be provided across each peak detector circuit. The first peak detector circuit 17, 18 will conduct during the negative peaks of the saw-tooth voltage applied thereto and a rectified current $i_3$ will flow through resistor 18 in the direction indicated by the arrow, causing a voltage of the polarity shown in the drawing to be established thereacross. The second peak detector circuit 19, 21 will conduct during positive peaks of the saw-tooth voltage applied thereto and a rectified current $i_4$ will flow in the direction of the arrow and will cause a voltage of the polarity indicated in the drawing to be established across resistor 21. It will be apparent that the voltages which are produced across the resistors 18 and 21, by rectification of the saw-tooth voltages applied to the peak detector circuits, are in series opposition. Thus the average voltage produced across capacitor 20, due to the application of the integrated oscillator derived pulses, is equal to zero although balanced saw-tooth voltages are produced across the respective peak detector circuits. It is also important to note that the source of oscillator derived pulses, namely the secondary 57, and the load capacitor 20 have a common point of fixed potential, namely the ground terminal 15.

While I have indicated the secondary 57 as being a convenient source which is suitable to establish the required saw-tooth voltage across the load capacitor 20, it will be apparent to those skilled in the art that any other suitable driving source may be utilized to provide the necessary saw-tooth voltage across capacitor 20.

Due to the fact that the capacitor 16, which is used to couple synchronizing pulses to the peak detector circuits is effectively shunted across the first peak detector circuit through the internal impedance of the synchronizing signal source $r_g$, the impedance of the first peak detector circuit 17, 18 is somewhat smaller than it would be if capacitor 16 were not present. To compensate for the effect of capacitor 16 upon the first peak detector circuit 17, 18, there is provided across the second peak detector circuit 19, 21 a capacitor 22, which produces an equivalent shunting effect across the second peak detector circuit so that both peak detector circuits have substantially equal impedances for the saw-tooth voltages applied thereto. It should be emphasized, however, that satisfactory operation may be obtained with considerable difference in size of the two saw-tooth voltages produced across the peak detector circuits, as will be apparent from the operation of the system discussed in more detail hereinafter.

Figures 7A, 7B, 7C, 7D:
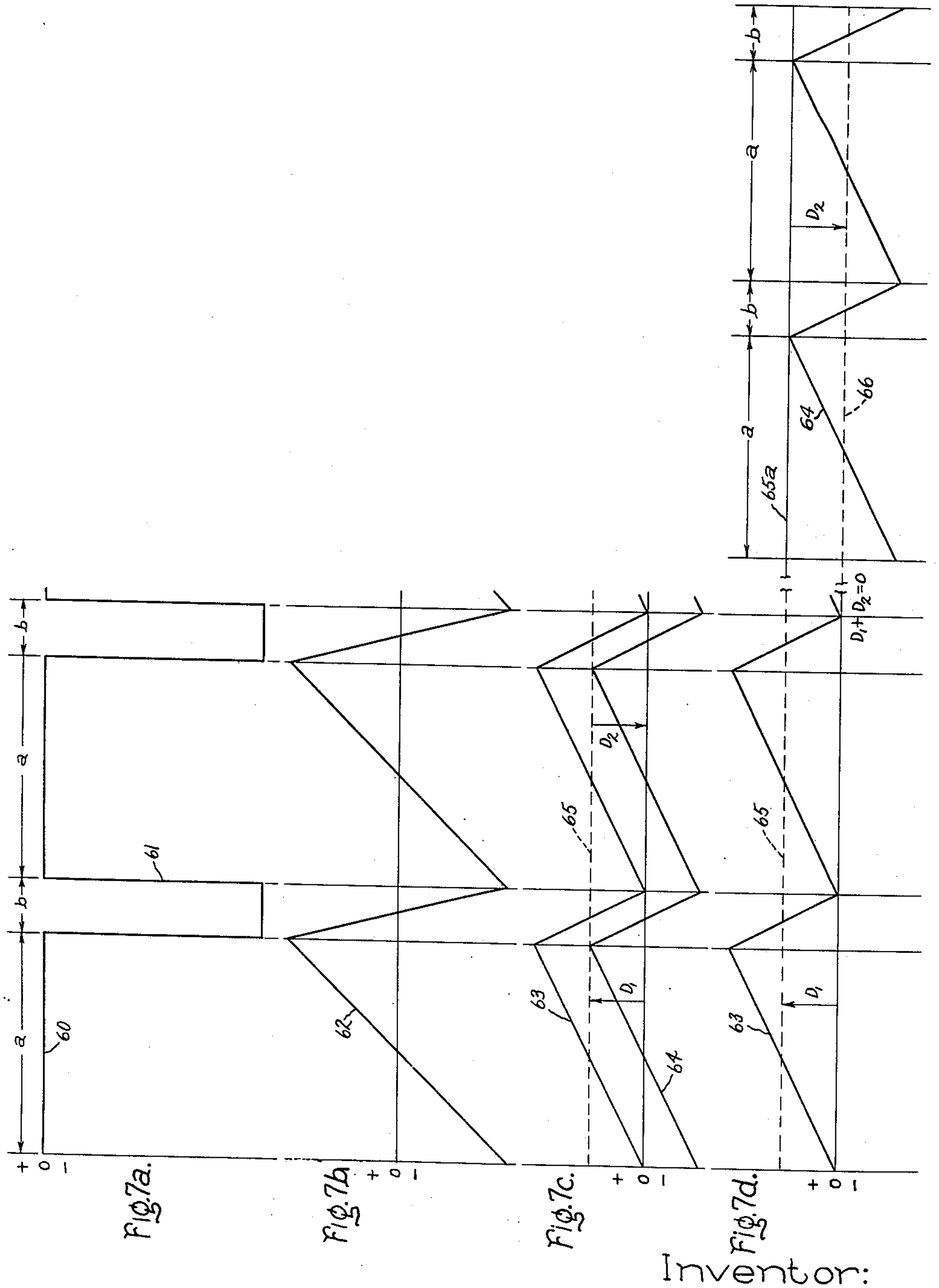
Figures 7E, 7F:
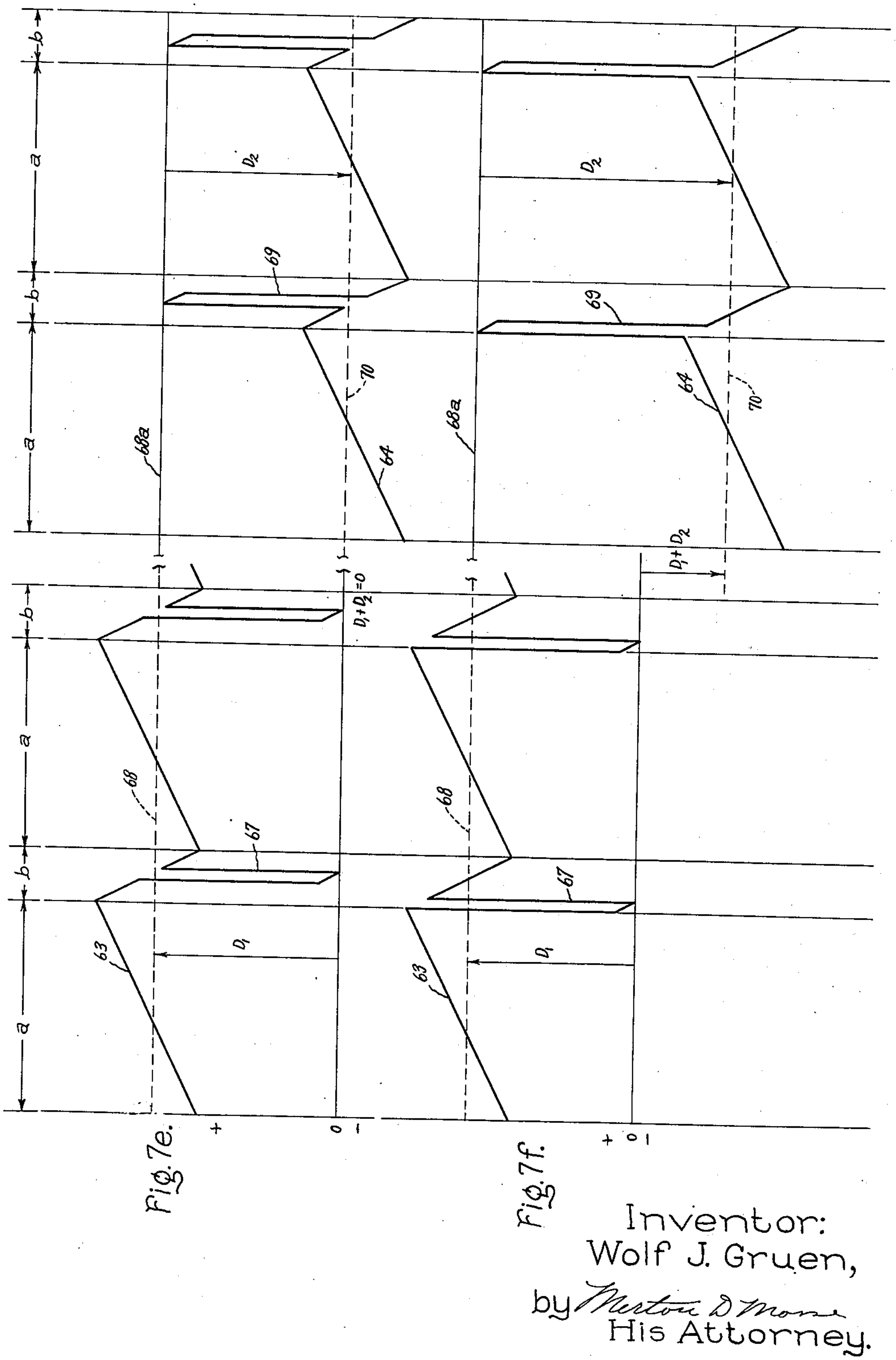
Figure 7B:
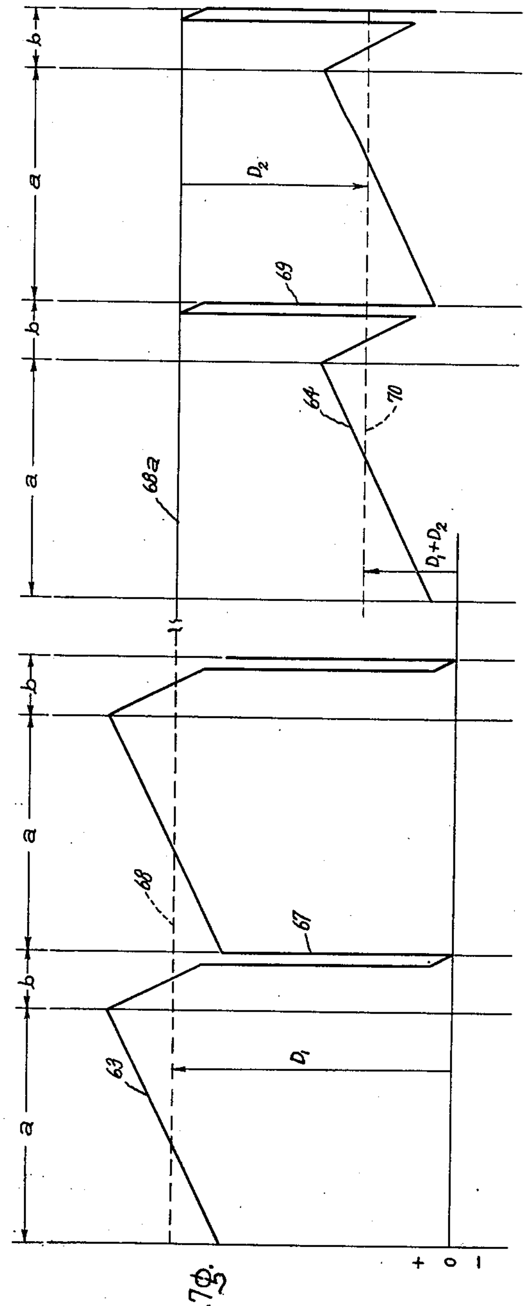

For further explanation of the operation of the phase detector circuit, reference is now made to Figs. 7 (*a*)–7 (*g*) wherein there are illustrated timing diagrams showing two complete cycles of operation. Fig. 7 (*a*) illustrates the negative pulse voltage which is produced across the secondary 57 of the sweep transformer 56 during retrace intervals. During the trace interval, which has been indicated in the drawing as the interval "*a*," the voltage across the secondary 57 will be substantially zero as indicated as 60, neglecting the voltage due to the flow of scanning current through the resistance of coil 57. However, during the retrace interval which has been indicated in the drawing by the letter "*b*," there is produced across the secondary 57 relatively large negative pulses indicated at 61.

Due to the integration of the pulses 61 by resistor 58 and load capacitor 20, the pulses are transformed into a saw-tooth wave form 62 which is illustrated in Fig. 7 (*b*). As has been previously mentioned, the isolation provided by capacitor 59 operates to place the alternating current axis of the saw-tooth voltage produced across capacitor 20 at zero potential as is shown in Fig. 7 (*b*).

The saw-tooth voltage 62, which is produced across capacitor 20, is divided in the ratio of the peak detector circuit impedances into two substantially equal saw-tooth voltages 63, 64, which are illustrated in Fig. 7 (*c*). The saw-tooth voltage 63 is produced across resistor 18, the peak to peak amplitude of this saw-tooth voltage being approximately one-half of the saw-tooth voltage 62 produced across capacitor 20. It is to be noted that saw-tooth voltage 63 is always positive with respect to zero, or ground potential, due to the clamping action of rectifier 17 which prevents a negative voltage from appearing across resistor 18. The average voltage produced across resistor 18 will be as indicated by the dotted line 65, and the amplitude of this voltage is indicated by the reference $D_1$.

Still referring to Fig. 7 (*c*), if we consider the action of the second peak detector circuit 19, 21, taking into account the above described average voltage 65 which is established across resistor 18, it is apparent that the voltage produced across resistor 21 is established with reference to the average voltage 65. Therefore, the saw-tooth voltage 64 is always negative with respect to the average level 65 established by the first peak detector circuit, due to the clamping action of diode 19 which prevents a positive voltage from appearing across resistor 21. As the saw-tooth voltages 63, 64 are of equal amplitude, the average voltage established across resistor 21 will be equal to the average voltage across resistor 18 and will have a polarity opposite thereto as illustrated by the reference $D_2$. The two saw-tooth voltages are superimposed one upon the other as is shown in Fig. 7 (c), and the summation of the two average voltages $D_1$ and $D_2$ will be equal to zero and coincide with the zero axis.

In order that the operation of the opposed detector circuits may be more clearly illustrated, the wave form of the saw-tooth voltage 64 has been illustrated in Fig. 7 (d) as being displaced to the right. The dotted line 65, which is the clamping level for the second peak detector circuit is continued into the right hand portion of the diagram as the solid line 65a, and the average level established across the second peak detector circuit is indicated by the dotted line 66. The average voltages produced by the peak detector circuits are again indicated in Fig. 7 (d) by the reference characters $D_1$ and $D_2$. By separating the waveforms of the saw-tooth voltages 63 and 64, the average voltages produced thereby may be more easily visualized. Such a separation of the waveforms associated with the two peak detector circuits becomes even more advantageous when considering the application of both synchronizing pulses and saw-tooth voltages to the peak detector circuits as will become apparent hereinafter. It will be seen from Fig. 7 (d) that the diode 17 operates to clamp the negative peaks of the saw-tooth voltage 63 to ground potential and establishes an average voltage across resistor 18 of the value indicated by the dotted line 65, and of a polarity indicated by the reference character $D_1$. Diode 19 operates to clamp the positive peaks of the saw-tooth voltage 64 to the average level 65 established by diode 17, and produces an average voltage indicated by the dotted line 66 of the polarity indicated by the reference character $D_2$. The average voltage across capacitor 20, which is the summation of voltages $D_1$ and $D_2$, is therefore zero.

Up to this point we have been considering the operation of the phase detector circuit when either synchronizing pulses or the oscillator feedback pulses are applied thereto. In actual operation both the synchronizing pulses and the oscillator feedback pulses are simultaneously applied to the phase detector circuit. The peak detectors 17, 18 and 19, 21 produce average voltages across their respective load resistors which are approximately equal to the peak voltages of the combined wave forms applied thereto. In considering the effects which are produced in each peak detector circuit due to the application of synchronizing pulses and saw-tooth voltages thereto, let us consider first the case wherein the synchronizing pulses are superimposed upon the central portions of the steep side of the saw-tooth voltages 63, 64 as illustrated in Fig. 7 (e). In Fig. 7 (e) synchronizing pulses 67, which appear as negative going pulses when viewed from the load circuit 20, and which are produced across resistor 18, are illustrated as being superimposed upon the central portion of the steep side of the saw-tooth voltage 63. The peak detector 17, 18 will produce across its load resistor 18 an average voltage which is approximately equal to the peak negative excursion of the combined pulse and saw-tooth wave from the zero axis thereof. The zero axis of the combined pulse and saw-tooth waveform 63, 67 will be as indicated by the dotted line 68. It will be understood that the rectifier 17 clamps the negative peak of the combined wave form to ground potential so that the average voltage produced across the load resistor 18 is of positive polarity with respect to ground potential, this average voltage being illustrated in Fig. 7 (e) by the reference character $D_1$. Inasmuch as the waveforms associated with the second peak detector circuit 19, 21 would be measured from dotted line 68 and therefore would be superimposed on the portion of the diagram already discussed, the dotted line 68 is continued into the right hand side of Fig. 7 (e) as solid line 68a and the waveforms associated with peak detector 19, 21 are shown in conjunction therewith in a manner similar to that described in connection with Fig. 7 (d). It is apparent that reference line 68a is the clamping level for the second peak detector 19, 21 and diode 19 clamps the combined pulse and saw-tooth waveform to that level, so that the voltage produced across resistor 21 is always negative with respect to clamping level 68a, as has been discussed more fully in connection with Fig. 7 (d).

It is to be noted that the synchronizing pulses, as viewed from the load circuit 20, appear as positive pulses 69 across resistor 21 due to the connection of the peak detector circuit 19, 21 as has been discussed more fully in connection with Fig. 5. The average voltage produced across resistor 21 is approximately equal to the peak positive excursion of the combined pulse and saw-tooth waveform from the zero axis thereof. The zero axis of the combined pulse and saw tooth waveform 69, 64 will be as indicated by the dotted line 70 in the right hand portion of Fig. 7 (e). It is to be noted that the rectifier 19 clamps the positive peak of the combined waveform to the level 68a, established by the first peak detector circuit 17, 18, so that the average voltage produced across load resistor 21 is of negative polarity with respect to the clamping level 68a, this average voltage being indicated in Fig. 7 (e) by the reference character $D_2$. It will be evident that the voltage $D_1$ due to the first peak detector circuit is exactly balanced by the voltage $D_2$, which is of the opposite polarity to voltage $D_1$, and therefore the voltage produced across capacitor 20, which is the summation of voltages $D_1$ and $D_2$ is zero when the saw-tooth voltage from the scanning oscillator and the synchronizing pulses have the phase relationship shown in Fig. 7 (e).

If we consider now the condition wherein the synchronizing pulses are leading the saw-tooth oscillator voltage, or in other words, the situation wherein the scanning oscillator is running slightly slow with respect to the synchronizing pulses, the situation is as illustrated in Fig. 7 (f). The average voltage $D_1$ which is produced by the first peak detector circuit 17, 18 is substantially reduced over its previous value due to the fact that the synchronizing pulses are superimposed upon a more positive portion of the saw-tooth voltage 63. Under these conditions the negative peak voltage of the combined waveform 63, 67 is substantially reduced and thus produces a substantially smaller voltage $D_1$. However, considering the right hand portion of the diagram wherein there is shown the waveforms associated with the second peak detector 19, 21, it is apparent that the voltage produced across resistor 21 has been substantially increased as the pulses 69 are again superimposed upon a more positive portion of the saw-tooth wave 64. The positive peak voltage of the combined waveform is thus substantially increased with consequent increase in the voltage $D_2$. The composite voltage wave which appears across capacitor 20 is the summation of voltages $D_1$ and $D_2$, and it is apparent that this composite voltage has an average value which is negative with respect to ground as indicated by the reference $D_1$ plus $D_2$ in Fig. 7 (*f*). The negative voltage across capacitor 20 is integrated in the networks 23, 24 and 25, 28, and applied to the control tube 30. The negative control voltage applied to control tube 30 increases the anode-cathode space path resistance of tube 30 and thus, operates to increase the frequency of the oscillator 40 so that the oscillator and synchronizing pulses tend to maintain the balanced phase condition shown in Fig. 7 (*e*).

If we consider now the other extreme of operation, namely when the synchronizing pulses lag the saw-tooth voltage, or in other words, when the oscillator is running at a slightly higher frequency than the synchronizing pulses, the situation is as illustrated in Fig. 7 (*g*). It is apparent from an inspection of Fig. 7 (*g*) that the average voltage $D_1$, which is produced by the first peak detector circuit, is substantially increased over its previous value in Fig. 7 (*e*), due to the fact that the synchronizing pulses 67 are superimposed on a more negative portion of the saw-tooth wave 63. It is also evident that the voltage $D_2$ produced by the second peak detector circuit, is substantially smaller than its previous value. The composite voltage across capacitor 20 is therefore positive with respect to ground as indicated by the reference $D_1$ and $D_2$ in Fig. 7 (*g*). The positive voltage appearing across capacitor 20 will change the anode-cathode space path resistance of control tube 30 in the proper direction to decrease the frequency of the oscillator 40, so that the synchronizing pulses and saw-tooth voltage tend to resume their balanced phase position illustrated in Fig. 7 (*e*).

An inspection of Fig. 7 (*e*) shows that when the synchronizing pulses and the saw-tooth voltage are in balanced relationship, the picture signal components which are produced between synchronizing pulses are lagging with respect to the beginning of the horizontal retrace period "*b*." This situation becomes more severe when the synchronizing pulses are lagging with respect to the phase position illustrated in Fig. 7 (*g*). Under such conditions the picture produced on the cathode ray tube may appear to be folded over on the righthand side of the cathode ray tube due to the fact that the retrace has already been initiated although the line has not been completely scanned. Such a situation may conveniently be compensated for by choosing the value of coupling capacitor 16 and compensating capacitor 22 so that the total series capacity of capacitors 16, 22 and 20 produces sufficient integration of the synchronizing pulses to correct for the above mentioned "fold over" condition. It will be understood that while the synchronizing pulses themselves are integrated slightly to correct for this condition, the synchronizing pulses have been separated previously from the picture signal components so that the latter are not affected by such integration.

A modified form of the balanced phase detector circuit of Fig. 2 is shown in Fig. 3. Inasmuch as the modified form of my invention shown in Fig. 3 differs from that of Fig. 2 only in certain particulars, only that portion of Fig. 2 to the left of section line *a*—*a* has been represented in Fig. 3. Corresponding elements have been designated by the same reference numerals and the function of these elements is essentially the same. In this modification the polarity of diodes 17, 19 has been reversed so that positive synchronizing pulses may be accepted at input terminals 14, 15. With the polarity of diodes 17, 19 reversed, the average voltages produced across peak detector load resistors 18, 21 will be correspondingly reversed from that of Figs. 5 and 6. However, the operation of the peak detector circuits will be substantially as described before, so that the control voltage which is produced across capacitor 20 remains of the proper polarity to correct the frequency of the scanning oscillator in the proper direction so as to maintain synchronism with the synchronizing pulses.

While the balanced phase detector circuit has been described in connection with negative feedback pulses derived from the secondary 57 of the sweep output transformer, it will be apparent to those skilled in the art that satisfactory operation may be obtained with pulses of either polarity which may be produced from various points in the horizontal deflection circuit. The use of positive oscillator feed-back pulses would merely invert the saw-tooth voltage obtained therefrom and would require an oscillator control circuit which would operate with the opposite polarity of control voltage.

An additional modification of my invention is represented in Fig. 4 wherein the portion to the left of section line *a*—*a* of Fig. 2 is reproduced. Corresponding elements are again designated by the same reference numerals and the function of these elements is essentially the same. In this modification the diode rectifiers and load resistances therefor have been replaced by a pair of rectifiers 72 and 73. Each of rectifiers 72, 73 has a finite back resistance which is represented by resistors 74, 75 indicated in dotted lines in Fig. 4. The rectifiers 72, 73 may comprise any type of cold cathode rectifier wherein the resistance to flow of electrical current in one direction is small and the resistance to flow of current in the opposite direction is large. Germanium rectifiers, for example, may conveniently be used as rectifiers 72, 73, although any type of cold cathode rectifier, as described above, is satisfactory. In the circuit of Fig. 4, the back resistance of rectifiers 72, 73 acts as the peak detector load resistors 18, 21 of Figs. 2 and 3. There is thus provided an extremely simple balanced phase detector circuit in which the number of components involved is minimized. It will be noted that compensating capacitor 22 has been retained in the circuit of Fig. 4 to compensate for the shunting effect of capacitor 16 as has been described more fully in connection with Fig. 2.

For completeness of illustration only, and not in any sense by way of limitation, the following circuit constants are given as being typical for a balanced phase detector circuit and associated horizontal deflection circuit of the type represented in Fig. 2. These constants have been found to be satisfactory for the circuit elements of a horizontal deflection circuit adapted to operate with negative synchronizing pulses of the standard recurrence rate of 15,750 cycles per second. In this particular circuit, rectifiers 17, 19 were embodied in the duo-diode section of a duo-diode high-mu triode type 6AQ7, the oscillator control tube 30 and oscillator tube 40 were embodied in a double triode type 6SN7GT and the horizontal output tube 52 was a type 6BG6-G beam power tetrode. Other circuit constants follow:

| | | |
|---|---|---|
| Capacitor 16 | mmf | 220 |
| Capacitor 20 | mmf | 1600 |
| Capacitor 22 | mmf | 120 |
| Capacitor 24 | mfd | .001 |
| Capacitor 26 | mfd | .005 |
| Capacitor 28 | mfd | .05 |
| Capacitor 32 | mmf | 470 |
| Capacitor 34 | mmf | 270 |
| Capacitor 38 | mmf | 2000 |
| Capacitor 43 | mmf | 3000 |
| Capacitor 45 | mmf | 3000 |
| Capacitor 48 | mfd | .01 |
| Capacitor 54 | mfd | 50 |
| Capacitor 59 | mfd | .05 |
| Capacitor 60 | mmf | 4 |
| Resistor 18 | megohms | 1 |
| Resistor 21 | do | 1 |
| Resistor 23 | ohms | 150,000 |
| Resistor 25 | megohms | 1 |
| Resistor 27 | ohms | 33,000 |
| Resistor 31 | do | 68,000 |
| Resistor 35 | do | 50,000 |
| Resistor 36 | do | 10,000 |
| Resistor 37 | do | 33,000 |
| Resistor 44 | do | 33,000 |
| Resistor 46 | do | 10,000 |
| Resistor 47 | do | 3300 |
| Resistor 49 | do | 15,000 |
| Resistor 50 | do | 330 |
| Resistor 53 | do | 82 |
| Resistor 58 | do | 66,000 |
| Resistor 61 | megohms | 1 |

Inductance 33 tuned to 15,750 C. P. S. with inductive center tap.

While I have shown particular embodiments of my invention, it will, of course, be understood that I do not wish to be limited thereto since various modifications may be made thereto, and I contemplate by the appended claims to cover all such modifications as fall within the true spirit and scope of my invention.

What I claim as new and desire to secure by Letters Patent of the United States is:

1. A balanced phase detector circuit comprising a load circuit, a pair of peak detector circuits connected in series opposition across said load circuit, a first source of signal voltage of predetermined fundamental frequency, means including said load circuit for connecting said peak detector circuits in parallel across said first source of signal voltage, a second source of signal voltage of the same predetermined fundamental frequency, means for connecting said second source of voltage across said load circuit, and means for deriving from said load circuit a control voltage which varies in accordance with changes in the relative phase of said first and second voltage sources.

2. A balanced phase detector circuit comprising a load circuit, a pair of peak detector circuits connected in series opposition across said load circuit, a first source of periodic signal voltage of predetermined fundamental frequency, means for connecting said first voltage source across one of said detector circuits, said load circuit effectively connecting the other of said detector circuits in parallel with said one detector circuit, a second source of periodic signal voltage of the same predetermined fundamental frequency, means for connecting said second source of voltage across said load circuit, and means for deriving from said load circuit a undirectional control voltage whose average value varies in accordance with changes in the relative phase of said first and second voltage sources.

3. A balanced phase detector circuit comprising a load circuit, a pair of rectifiers connected in series opposition across said load circuit, each of said rectifiers having a return path of finite resistance for rectified currents, a first source of periodic signal voltage of predetermined fundamental frequency, means including said load circuit for connecting said rectifiers in parallel across said first source of voltage, a second source of periodic signal voltage of the same predetermined fundamental frequency, means for connecting said second source of voltage across said load circuit, and means for deriving from said load circuit a unidirectional control voltage which varies in accordance with changes in the relative phase of said first and second voltage sources.

4. A balanced phase detector circuit comprising a load circuit, a pair of rectifiers connected in series opposition across said load circuit, each of said rectifiers having a return path of finite resistance for rectified currents, a first source of periodic signal voltage of predetermined fundamental frequency, means for connecting said first voltage source across one of said rectifiers, said load circuit effectively connecting the other of said rectifiers in parallel with said one rectifier, a second source of periodic signal voltage of the same predetermined fundamental frequency, means for connecting said second source of voltage across said load circuit, and means for deriving from said load circuit a control voltage which varies in accordance with changes in the relative phase of said first and second voltage sources.

5. A balanced phase detector comprising a primary source of periodic pulses, a secondary source of periodic pulses, and a load circuit, said primary and secondary sources and said load impedance all having one side connected to a common point of fixed potential, a first rectifier connected across a portion of said load circuit with a given polarity, a second rectifier connected across another portion of said load circuit with the opposite polarity, means including a capacitor for connecting said primary source of pulses across said first rectifier, means for supplying said secondary pulses across said load circuit, and means for deriving from said load circuit a control voltage which varies with respect to said point of fixed potential in accordance with changes in the relative phase of said primary and secondary pulse sources.

6. A balanced phase detector comprising a primary source of recurrent pulses, a secondary source of recurrent pulses and a load circuit, said primary and secondary sources and said load impedance all having one side connected to a common point of fixed potential, a first peak detector circuit connected across a portion of said load circuit with a given polarity, a second peak detector circuit connected across another portion of said load circuit with the opposite polarity, means for connecting said primary source of pulses across said first peak detector circuit, means for supplying said secondary pulses across said load circuit, and means for deriving from said load circuit a control voltage whose average value varies with respect to said point of fixed potential in accordance with changes in the relative phase of said primary and secondary pulse sources.

7. In an automatic frequency control circuit of the type including a source of synchronizing pulses of predetermined fundamental frequency, a scanning wave generator, means for obtaining a feedback signal of the same predetermined fundamental frequency from said generator and a load circuit, said synchronizing pulse source, said feedback signal source and said load circuit all having one side connected to a common point of fixed potential, the combination comprising a pair of peak detector circuits connected in series opposition across said load circuit, means for impressing said synchronizing pulses across one of said detector circuits, said load circuit effectively connecting the other of said detector circuits across said source in parallel with said one detector circuit, means for impressing said feedback signal across said load circuit, and means for deriving from said load circuit a control voltage which varies with respect to said point of fixed potential in accordance with changes in the relative phase of said synchronizing pulses and said feedback signal.

8. In an automatic frequency control circuit for a television receiver of the type including a source of periodic synchronizing pulses, a scanning wave generator adapted to be synchronized at the funamental frequency of said pulses, means for obtaining a feedback signal from the output of said generator and a load circuit, the combination comprising a pair of rectifiers connected in series opposition across said load circuit, each of said rectifiers having a return path of finite resistance for rectified currents, means for impressing said synchronizing pulses across one of said rectifiers, said load circuit effectively connecting the other of said rectifiers across said source in parallel with said one rectifier, means for impressing said feedback signal across said load circuit, and means for deriving from said load circuit a unidirectional control voltage which varies in accordance with changes in the relative phase of said synchronizing pulses and said feedback signal.

9. In a television receiver of the type including a source of synchronizing pulses and an oscillation generator, means for obtaining pulses from said oscillation generator, a first capacitor, a pair of peak detector circuits connected in series opposition across said first capacitor, means including a second capacitor in series with said source for impressing said synchronizing pulses across one of said detector circuits, said first capacitor effectively connecting the other of said detector circuits across said source in parallel with said one detector circuit, means for impressing said oscillator pulses across said first capacitor, and means for deriving from said first capacitor a control voltage which varies in accordance with changes in the relative phase of said synchronizing pulses and said oscillator pulses.

10. In a television receiver of the type including a source of synchronizing pulses and an oscillation generator, means for obtaining pulses from said oscillation generator, a first capacitor, a pair of peak detector circuits connected in series opposition across said first capacitor, means including a second capacitor in series with said source for impressing said synchronizing pulses across one of said detector circuits, said first capacitor effectively connecting the other of said detector circuits across said source in parallel with said one detector circuit, means for impressing said oscillator pulses across said first capacitor, a third capacitor connected across the other of said detector circuits, and means for deriving from said first capacitor a control voltage which varies in accordance with changes in the relative phase of said synchronizing pulses and said oscillator pulses, said first, second, and third capacitors having a total series capacity sufficient to integrate said synchronizing pulses so as to obtain a predetermined initial phase shift between said synchronizing pulses and said oscillation generator.

11. In a television receiver of the type including a souce of recurrent synchronizing pulses and a scanning wave generator adapted to be synchronized at the fundamental frequency of said pulses, means for obtaining control pulses from the output of said generator, a first capacitor, first and second rectifiers connected in series opposition across said first capacitor, each of said rectifiers having a return path of finite resistance for rectified currents, means including a second capacitor in series with said source for impressing said synchronizing pulses across said first rectifier, said first capacitor having a value substantially larger than said second capacitor, thereby effectively to connect said second rectifier in parallel with said first rectifier and said source of synchronizing pulses, means for impressing said control pulses across said first capacitor, a third balancing capacitor connected across said second rectifier, said third capacitor having a value substantially to balance the voltages developed in response to said control pulses across said first and second rectifiers respectively, and means for deriving from said first capacitor a control voltage which varies in accordance with changes in the relative phase of said synchronizing pulses and said oscillating pulses.

12. In a television receiver of the type including a source of recurrent synchronizing pulses and a scanning wave generator, means for obtaining control pulses from the output of said generator, a first capacitor, first and second rectifiers connected in series opposition across said first capacitor, means including a second capacitor in series with said source for impressing said synchronizing pulses across said first rectifier, said first capacitor having a value substantially larger than said second capacitor, thereby effectively to connect said second rectifier in parallel with said first rectifier and said source of synchronizing pulses, means for impressing said control pulses across said first capacitor, a third, balancing capacitor connected across said second rectifier, said third capacitor having a value substantially to balance the voltages developed in response to said control pulses across said first and second rectifiers respectively, and means for deriving from said first capacitor a unidirectional control voltage which varies in accordance with changes in the relative phase of said synchronizing pulses and said control pulses, said first, second, and third capacitors having a total series capacity sufficient to integrate said synchronizing pulses so as to obtain a predetermined initial phase shift between said synchronizing pulses and said control pulses.

13. In a television receiver of the type including a source of line synchronizing pulses and a line sweep generator, means for obtaining control pulses from the output of said sweep generator, a first capacitor, first and second resistors connected in series across said first capacitor, a first rectifier connected across said first resistor with a given polarity, a second rectifier connected across said second resistor with the opposite polarity, means including a second capacitor in series with said source for impressing said synchronizing pulses across said first rectifier and resistor combination, said first capacitor having a value substantially larger than said second capacitor, thereby effectively to connect said second rectifier and resistor combination in parallel with said first rectifier and resistor combination and said source of synchronizing pulses, means for impressing said control pulses across said first capacitor, a third, balancing capacitor connected across said second rectifier and resistor combination, said third capacitor having a value substantially to balance the voltages developed in response to said control pulses across said first and second rectifiers respectively, and means for deriving from said first capacitor a unidirectional control voltage for said generator which varies in accordance with changes in the relative phase of said synchronizing pulses and said oscillator pulses.

14. In a television receiver of the type including a source of line synchronizing pulses of predetermined fundamental frequency, a line sweep generator capable of being synchronized at the same fundamental frequency, means for obtaining feedback pulses from the output of said sweep generator, a first capacitor, first and second resistors connected in series across said first capacitor, a first rectifier connected across said first resistor with a given polarity, a second rectifier connected across said second resistor with the opposite polarity, means including a second capacitor in series with said source for impressing said synchronizing pulses across said first rectifier and resistor combination, said first capacitor having a value substantially larger than said second capacitor, thereby effectively to connect said second rectifier and resistor combination in parallel with said first rectifier and resistor combination and said source of synchronizing pulses, means for impressing said feedback pulses across said first capacitor, a third, balancing capacitor connected across said second rectifier and resistor combination, and means for deriving from said first capacitor a unidirectional control voltage for said generator whose average value varies in accordance with changes in the relative phase of said synchronizing pulses and said feedback pulses, said first, second, and third capacitors having a total series capacity sufficient to integrate said synchronizing pulses so as to obtain a predetermined initial phase shift between said synchronizing pulses and said feedback pulses.

WOLF J. GRUEN.

REFERENCES CITED

The following references are of record in the file of this patent:

UNITED STATES PATENTS

| Number | Name | Date |
|---|---|---|
| 2,339,536 | Wendt | Jan. 18, 1944 |
| 2,462,759 | McCoy | Feb. 22, 1949 |

FOREIGN PATENTS

| Number | Country | Date |
|---|---|---|
| 565,703 | Great Britain | Nov. 23, 1944 |